(12) United States Patent
Yoo et al.

(10) Patent No.: US 6,873,625 B1
(45) Date of Patent: Mar. 29, 2005

(54) INTERMEDIATE DATA BASED VIDEO/AUDIO STREAMING METHOD

(75) Inventors: Hyuck Yoo, San Jose, CA (US); Jin-Hwan Jeong, Seoul (KR)

(73) Assignee: Thin Multimedia, Inc., Palo Alto, CA (US)

( * ) Notice: Subject to any disclaimer, the term of this patent is extended or adjusted under 35 U.S.C. 154(b) by 0 days.

(21) Appl. No.: 09/574,703

(22) Filed: May 18, 2000

(30) Foreign Application Priority Data

May 21, 1999 (KR) ........................................ 1999-18489

(51) Int. Cl.[7] ................................................. H04J 3/22
(52) U.S. Cl. ...................... 370/465; 370/466; 370/467; 370/474; 370/395.64; 348/410; 348/423; 375/240.02
(58) Field of Search ................................ 370/474, 465, 370/466, 467, 395.64, 389; 348/384, 409, 410, 423, 845, 441, 461, 467, 469, 472; 375/240, 240.01, 240.02

(56) References Cited

U.S. PATENT DOCUMENTS

| | | | | |
|---|---|---|---|---|
| 5,541,852 A | * | 7/1996 | Eyuboglu et al. | ........... 709/232 |
| 5,666,487 A | * | 9/1997 | Goodman et al. | .......... 709/246 |
| 5,671,204 A | * | 9/1997 | Yokouchi et al. | ........ 369/47.33 |
| 5,841,472 A | * | 11/1998 | Rim et al. | ............. 375/240.25 |
| 6,072,771 A | * | 6/2000 | Anderson et al. | ........... 370/216 |
| 6,351,474 B1 | * | 2/2002 | Robinett et al. | ............ 370/486 |
| 6,385,771 B1 | * | 5/2002 | Gordon | ....................... 725/90 |

* cited by examiner

Primary Examiner—Alpus H. Hsu
Assistant Examiner—Clemence Han
(74) Attorney, Agent, or Firm—Townsend and Townsend and Crew LLP

(57) ABSTRACT

There is provided an intermediate data based video/audio streaming method in which, in the transmission of video/audio data, a server transmits the video/audio data in the form of intermediate data and a client receives and directly processes it without using an additional decompression apparatus, allowing easy video/audio data transfer and simplifying the structure of the client system. The method includes: a video/audio transmitting step of, in case that the server transmits a video/audio file to the client, converting compressed video/audio data to be transmitted into intermediate data and duplicating the intermediate data into a packet to transmit it to the client; and, in case that the client processes the intermediate data transmitted through the network, an intermediate data receiving step of analyzing the received packet, when the analyzed result corresponds to a video intermediate data packet, reconstructing the original video data from the video intermediate data duplicated into the packet and then outputting it, and, when the received packet corresponds to an audio intermediate data packet, converting the audio intermediate data duplicated into the packet into analog voice data and outputting it.

5 Claims, 5 Drawing Sheets

| Header length | packet data (DC, YUV, PCM, ADPCM) |
|---|---|
| Must be less than MTU size (1500bytes) (32bits aligned) | |

*FIG. 7a*

| Packet header ||||
|---|---|---|---|
| Header length | Bits | Value | Description |
| 20 bytes | 8 | 0xA0 | YUV data |
| | | 0xA1 | PCM data |
| | | 0xA2 | DC data |
| | | 0xA3 | ADPCM data |
| | 24 | Integer | Packet number |
| | 32 | * * * | Field for controlling data designated by command ID |
| | 32 | * * * | |
| | 32 | * * * | |
| | 32 | | Reservation |

*FIG. 7b*

INTERMEDIATE DATA BASED VIDEO/AUDIO STREAMING METHOD

CROSS-REFERENCES TO RELATED APPLICATIONS

This application claims priority to Korean Application No. 99-18489 filed May 21, 1999 incorporated by reference herein.

BACKGROUND OF THE INVENTION

1. Field of the Invention

The present invention relates to a video/audio data transmission through a network and, more particularly, to an intermediate data based video/audio streaming method in which, in the transmission of video/audio data, a server transmits the video/audio data in the form of intermediate data and a client receives and directly processes it without using an additional decompression apparatus, allowing easy video/audio data transfer and simplifying the structure of the client system.

2. Discussion of Related Art

In general, in the transmission of video (moving picture and still picture) data through a network, a transmitting side compresses the video data to be transmitted with various compression methods and then transmit it in view of a limited data transfer rate and the amount of data transmitted in the network. In this case, though the amount of data transmitted is remarkably reduced, a receiving side requires a separate apparatus for receiving the compressed video data and an apparatus for decompressing it, to receive and process the transmitted video data.

FIG. 1 roughly illustrates the configuration of a conventional video/audio data processor, which shows a procedure that a computer opens a video file (JPEG, MPEG-1, MPEG-2, H.261, H.263, and so on) and executes it. Referring to FIG. 1, a data storage 1 stores the video file, and a decoder 2 which consists of a video decoder and audio decoder opens the video file stored in data storage 1, divides it into a video signal and an audio signal and decodes them using respective decoders. That is, the video decoder decodes the divided video signal while the audio decoder decodes the divided audio signal. Further, a video outputting unit 3 outputs the video signal decoded by decoder 2 and an audio outputting unit 4 externally outputs the audio signal decoded by decoder 2.

FIG. 2 roughly illustrates the configuration of a conventional apparatus for video/audio data transmission and reception through a network, usually employed in a general VOD (Video On Demand). Referring to FIG. 2, the apparatus is classified into a server 10 and client 20. Server 10 stores a plurality of video files at a data storage 11 and, when client 20 requests any video file, extracts the corresponding file to transmit it. Client 20 temporarily stores the video data supplied from server 10 at a buffer 21. A decoder 22 sequentially reads the data stored at buffer 21 and divides it into a video signal and an audio signal. Then, decoder 22 decodes the video signal using its inner video decoder and transmits it to a video outputting unit 23, thereby outputting the video data. Further, decoder 22 decodes the audio signal using its inner audio decoder and transfers it to an audio outputting unit 24, thereby accomplishing the output of audio data.

In this conventional media file streaming method, the server transmits the compressed video file itself and the client decompresses the compressed video file. That is, when the client requests a specific video file, the server reads and transmits the file itself. Here, the server simply reads the corresponding compressed file and transfers it to the network without any change. Accordingly, the client needs an additional apparatus for decompressing the compressed file and decoding it to reconstruct the compressed file. This results in complicated configuration of the client. Furthermore, the reception of the compressed file also requires a high-speed central processing unit. Accordingly, the hardware of the client system become difficult to realize and product cost increases.

SUMMARY OF THE INVENTION

Accordingly, the present invention directed to an intermediate data based video/audio streaming method that substantially obviates one or more of the problems due to limitations and disadvantages of the related art.

An object of the present invention is to provide an intermediate data based video/audio streaming method in which in the transmission of video/audio data, a server transmits the video/audio data in the form of intermediate data and a client receives and directly processes it without using an additional decompression apparatus, allowing easy transferring of video/audio data and simplifying the structure of the client system.

The intermediate data indicates pulse code modulation data (hereinafter, it is referred to as "PCM" data), adaptive differential pulse code modulation data (referred to as "ADPCM" data hereinafter), discrete cosine data (referred to as "DC" data) and Y, U, V (video signal components used in PAL or MAC system which corresponds to Y, I, Q in NTSC system, referred to as "YUV" data hereinafter).

In order to achieve the above object, in a method of streaming video/audio data through a network between a server and a client, the method comprising:

a video/audio transmitting step of, in case that the server transmits a video/audio file to the client, converting compressed video/audio data to be transmitted into intermediate data and duplicating the intermediate data into a packet to transmit it to the client; and in case that the client processes the intermediate data transmitted through the network, an intermediate data receiving step of a) analyzing the received packet, when the analyzed result corresponds to a video intermediate data packet, reconstructing the original video data from the video intermediate data duplicated into the packet and then outputting it, and b) when the received packet corresponds to an audio intermediate data packet, converting the audio intermediate data duplicated into the packet into analog voice data and outputting it.

In the above, the video/audio transmitting step comprises:

a first step of, in case that the server transmits the video/audio file to the client, confirming by the server if the compressed file is an audio file, and confirming if the transmission form of the file corresponds to PCM transmission when the file is the audio file;

a second step of converting the audio file to be transmitted into PCM data in case of the PCM transmission;

a third step of converting the audio file to be transmitted into ADPCM data when it is confirmed that its transmission form does not correspond to PCM transmission;

a fourth step of, when the compressed file corresponds to a video file, confirming if its transmission form corresponds to DC transmission;

a fifth step of converting the compressed video file into DC data in case of the DC transmission;

a sixth step of converting the compressed video file into YUV data when it is confirmed that its transmission form does not correspond to DC transmission; and a seventh step of transmitting the converted audio/video intermediate data to the network.

According to the aspect of the present invention, the seventh step comprises the steps of:

in case that there is intermediate data to be transmitted to the network, confirming the type of the intermediate data, generating an ADPCM packet header when the intermediate data to be transmitted is ADPCM data, and duplicating a predetermined amount of ADPCM data into the packet generated;

generating a PCM packet header when the intermediate data to be transmitted corresponds to PCM data;

duplicating a predetermined amount of PCM data into the packet having the generated PCM header;

generating a DC packet header when the intermediate data to be transmitted is DC data, and duplicating a predetermined amount of DC data into the packet having the generated DC header;

generating a YUV packet header when the intermediate data to be transmitted is YUV data;

duplicating a predetermined amount of YUV data into the packet having the generated YUV header; and transmitting the packet into which the intermediate data is duplicated to the network.

Furthermore, the procedure performed at the client side comprises:

a first step of analyzing the header of a packet received through the network;

a second step of inverse-discrete-cosine-transforming the video intermediate data when the received packet is a DC packet;

a third step of reconstructing sub-sampled data when the received packet is a YUV packet;

a fourth step of converting the reconstructed data into RGB signals;

a fifth step of scaling the RGB signals;

a sixth step of displaying the scaled video signals on a picture;

a seventh step of, when the received packet is an ADPCM packet, converting the received ADPCM intermediate data into PCM data;

an eighth step of converting the PCM data converted or, when the received packet is a PCM packet, corresponding PCM data into an analog voice signal; and a ninth step of outputting the analog voice signal through a speaker.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings: In the drawings:

FIGS. 7A and 7B are protocol structures of an intermediate data packet proposed by the present invention.

DESCRIPTION OF THE SPECIFIC EMBODIMENTS

Reference will now be made in detail to the preferred embodiments of the present invention, examples of which are illustrated in the accompanying drawings.

Figure 1:
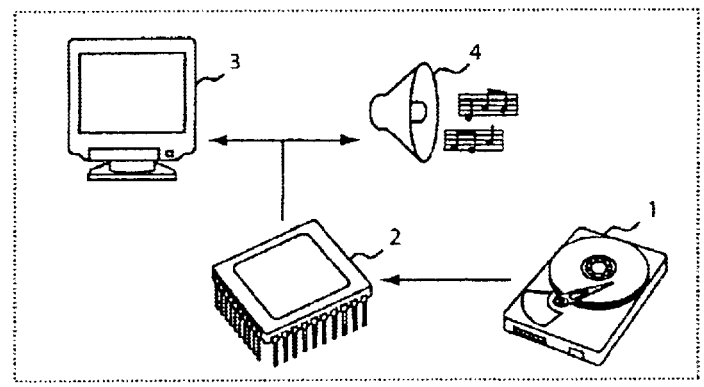
FIG. 1 roughly illustrates the configuration of a conventional video/audio data processor.
Figure 2:
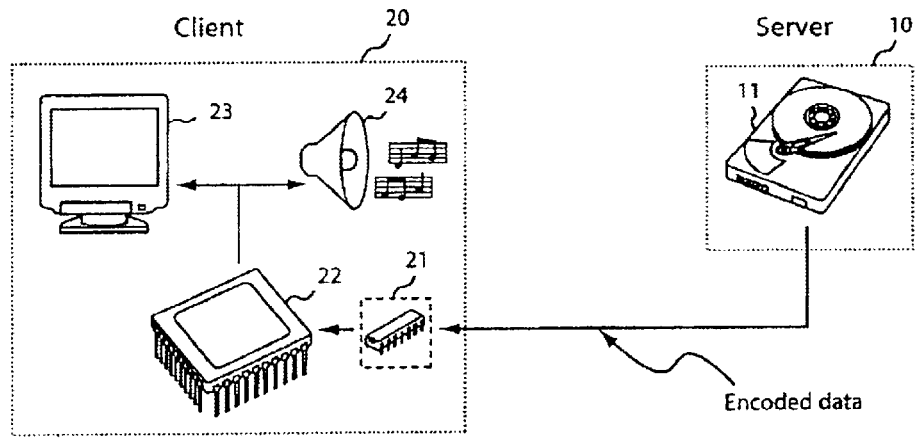
FIG. 2 roughly illustrates the configuration of a conventional apparatus for video/audio data transmission and reception through a network.
Figure 3:
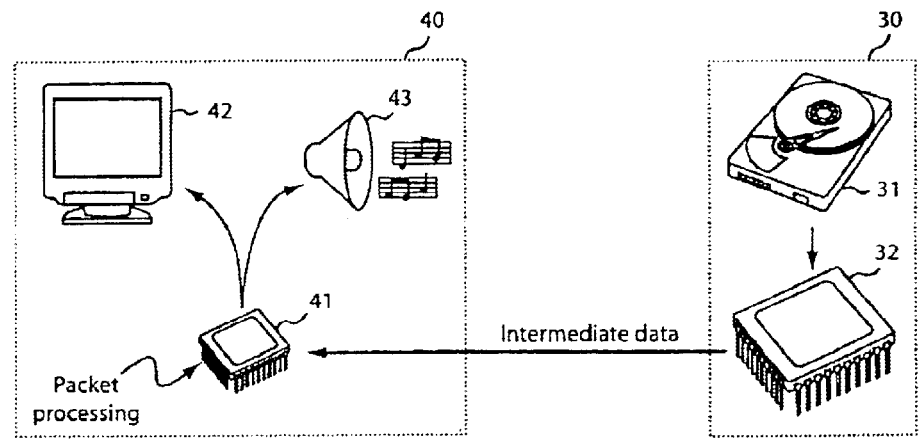
FIG. 3 illustrates the configuration of a network system to which an intermediate data based video/audio streaming method proposed by the present invention is applied.

FIG. 3 illustrates the configuration of a network system to which an intermediate data based video/audio streaming method proposed by the present invention is applied. This network system is roughly classified into a server 30 and a client 40. Server 30 stores compressed video/audio files at a data storage 31 therein, and an intermediate data generator 32 of server 30 converts the compressed video/audio files stored at data storage 31 into intermediate data to transmit it to the network. Here, the greatest difference between server 30 to which the present invention is applied and the conventional one (10 of FIG. 2) is that server 30 of the present invention converts the compressed video/audio files into intermediate data forms and transmits them to the network to provides them to the client while conventional server 10 transfers the video/audio file requested by client 20 in the compressed form to client 20 through the network.

At client side 40, a packet processor 41 receives a packet including the intermediate data transmitted through the network, processes it in real time, delivers the processed video signal to a video outputting unit 42 to output the video data, and sends the processed audio signal to a n audio outputting unit 43 to output the audio data. That is, packet processor 41 can process the received intermediate data in real time because the packet data is transmitted in the form of intermediate data through the network. In other words, the client simply processes the received video packet according to the form of intermediate data. Accordingly, the hardware structure of the client system can be simplified.

Figure 4:
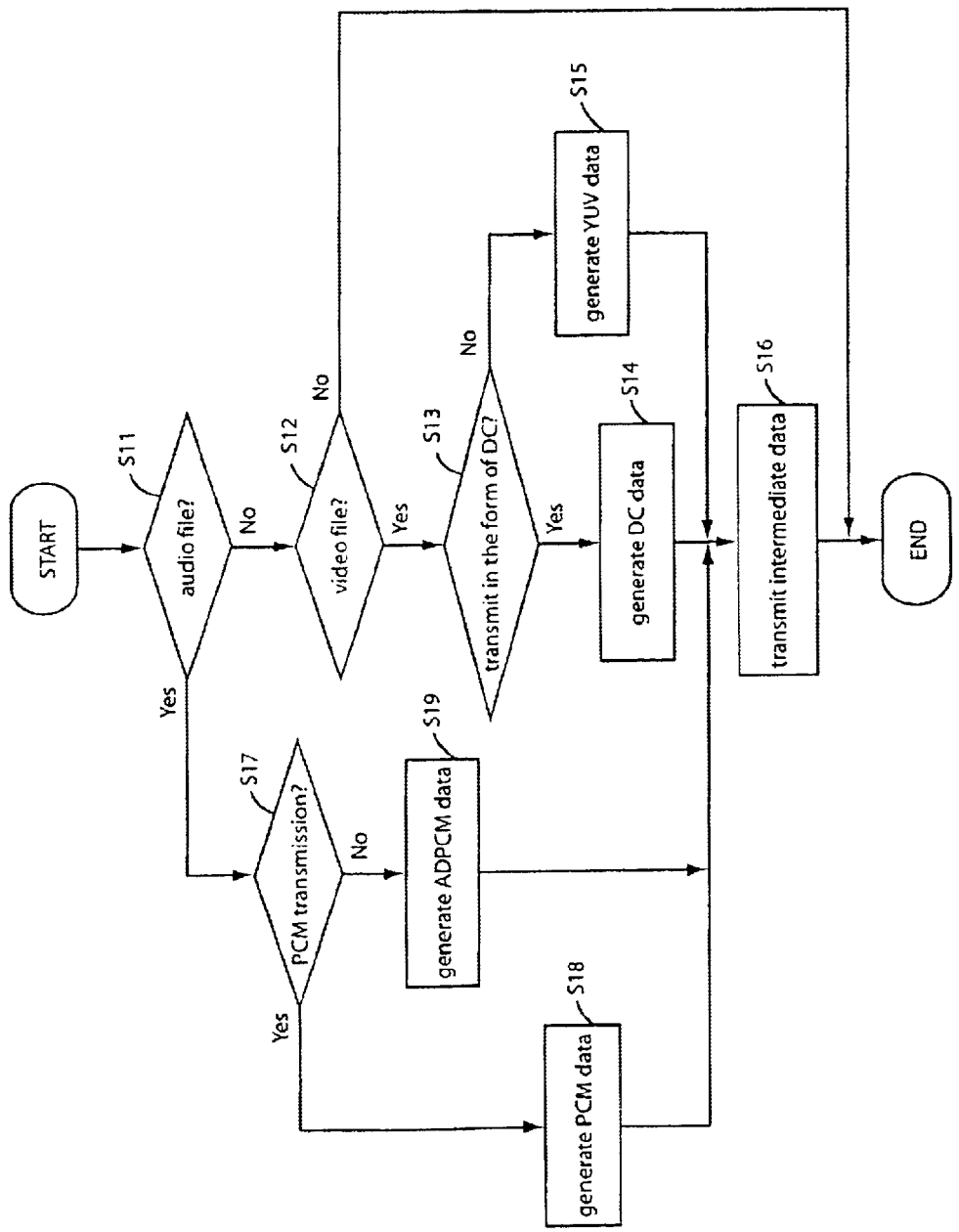
FIG. 4 is a flow diagram showing an intermediate data transmitting procedure at a server side during the intermediate data based video/audio streaming according to the present invention.

FIG. 4 is a flow diagram showing a packet generation and transmission procedure at the server side during the intermediate data based video/audio streaming according to the present invention. Referring to FIG. 4, in case that the server transmits a video/audio file to the client, the procedure at the server includes a step S11 of confirming if the compressed file is an audio file, a step S17 of confirming, when it is the audio file, if the transmission form of the file is PCM data, a step S18 of converting the compressed audio file into PCM data in case of PCM transmission, a step S19 of converting the compressed audio file into ADPCM data when it is confirmed that the transmission form is not PCM data in step S17, a step S12 of confirming if the compressed file is a video file, a step S13 of, when the file to be transmitted is the video file, searching its transmission form, a step S14 of generating DC data when the video file is transmitted in the form of DC data, a step S15 of generating YUV data when the searched transmission form is YUV data in step S13, and a step S16 of transmitting the intermediate data (ADPCM data, PCM data, DC data or YUV data) to a network.

There is described below in more detail the procedure of transferring the video/audio file from the server to the client according to the present invention constructed as above. In step S11, the server first confirms if the file requested by the client is the audio file. When it is, the intermediate data generator of the server reads the corresponding audio file stored in the data storage. Then, the transmission form of the audio data is searched in step S17, and the read audio file is converted into PCM data as audio intermediate data in step S18 when the searched result corresponds to PCM data transmission. On the other hand, when the transmission form of the audio data corresponds to ADPCM data in step S17, the read audio file is converted into the ADPCM data as audio intermediate data in step S19. That is, the present invention sets the ADPCM data and PCM data as the audio intermediate data when the file to be transmitted is the audio file.

Meanwhile, when the file requested by the client is the video file, the intermediate data generator of the server reads the corresponding video file stored in the data storage. Subsequently, the transmission form of the video data is searched in step S13, and, when the searched result corresponds to the DC data form, the read video file/the is converted into DC data as video intermediate data in step S14. The DC data is obtained by variable-length-demodulating the compressed video data and transforming the variable-length-demodulated video data into a frequency range to inverse-quantize it. In contrast, when the transmission form of the video data is the YUV data form in step S13, the read video file is converted into the YUV data as video intermediate data in step S15. The present invention sets the YUV data as another example of the video intermediate data. That is, the present invention sets the DC data that is inverse-quantized data and the YUV data that is inverse-discrete-cosine-transformed data as the intermediate data. The intermediate data items (DC data, YUV data, PCM data and ADPCM data) obtained through the aforementioned conversion process are separately transmitted to the client in step S16.

Figure 5:
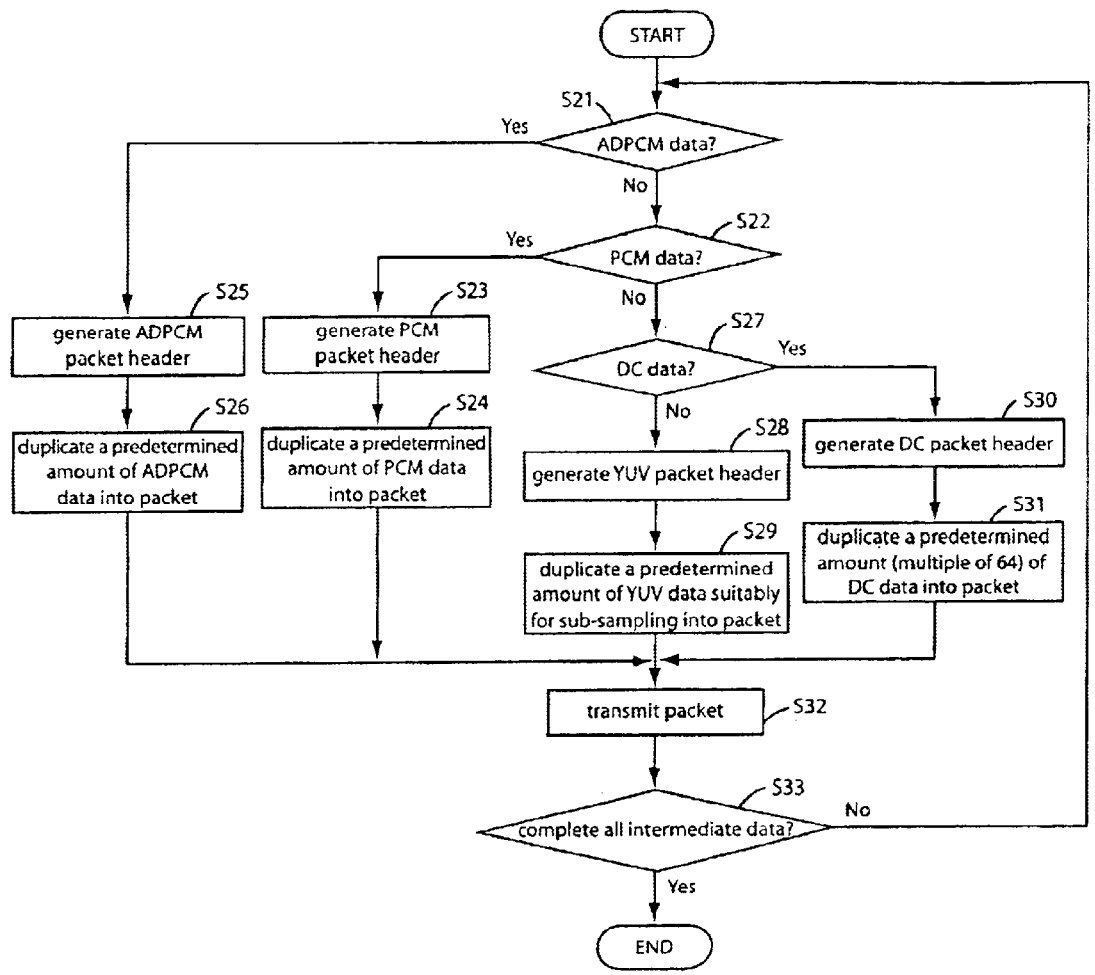
FIG. 5 is a flow diagram showing the intermediate data transmission procedure of FIG. 4 in more detail.

FIG. 5 shows a procedure of transmitting the audio/video data that have been converted into the intermediate data. Referring to FIG. 5, when there is the intermediate data to be transferred to the network, it is first confirmed if the intermediate data is the ADPCM data in a step S21. When it is, an ADPCM packet header is generated in a step S25, and a predetermined amount of ADPCM is duplicated into the packet having the generated ADPCM header in a step S26. When the intermediate data to be transmitted is not the ADPCM data in step S21, it is confirmed if the intermediate data corresponds to the PCM data in a step S22. When it is, a PCM packet header is generated in a step S23, and then a predetermined amount of PCM data is duplicated into the packet having the PCM header in a step S24.

When the intermediate data to be transferred is not the PCM data, it is confirmed if the data is the DC data in a step S27. When it is, a DC packet header is generated in a step S30 and a predetermined amount of DC data is duplicated into the packet having the DC header. On the other hand, when it is confirmed that the intermediate data is not the DC data in step S27, it corresponds to the YUV data, generating a YUV packet header in a step S28. Subsequently, in a step S29, a predetermined amount of YUV data is duplicated into the packet having the YUV header, to be suitable for sub-sampling. The packet into which the ADPCM data or PCM data, or DC data or YUV data is duplicated is transmitted to the network in a step S32. It is confirmed if there is more intermediate data to be transmitted in a step S33 and, when there is, the procedure returns to step S21, repeating the processes.

Figure 6:
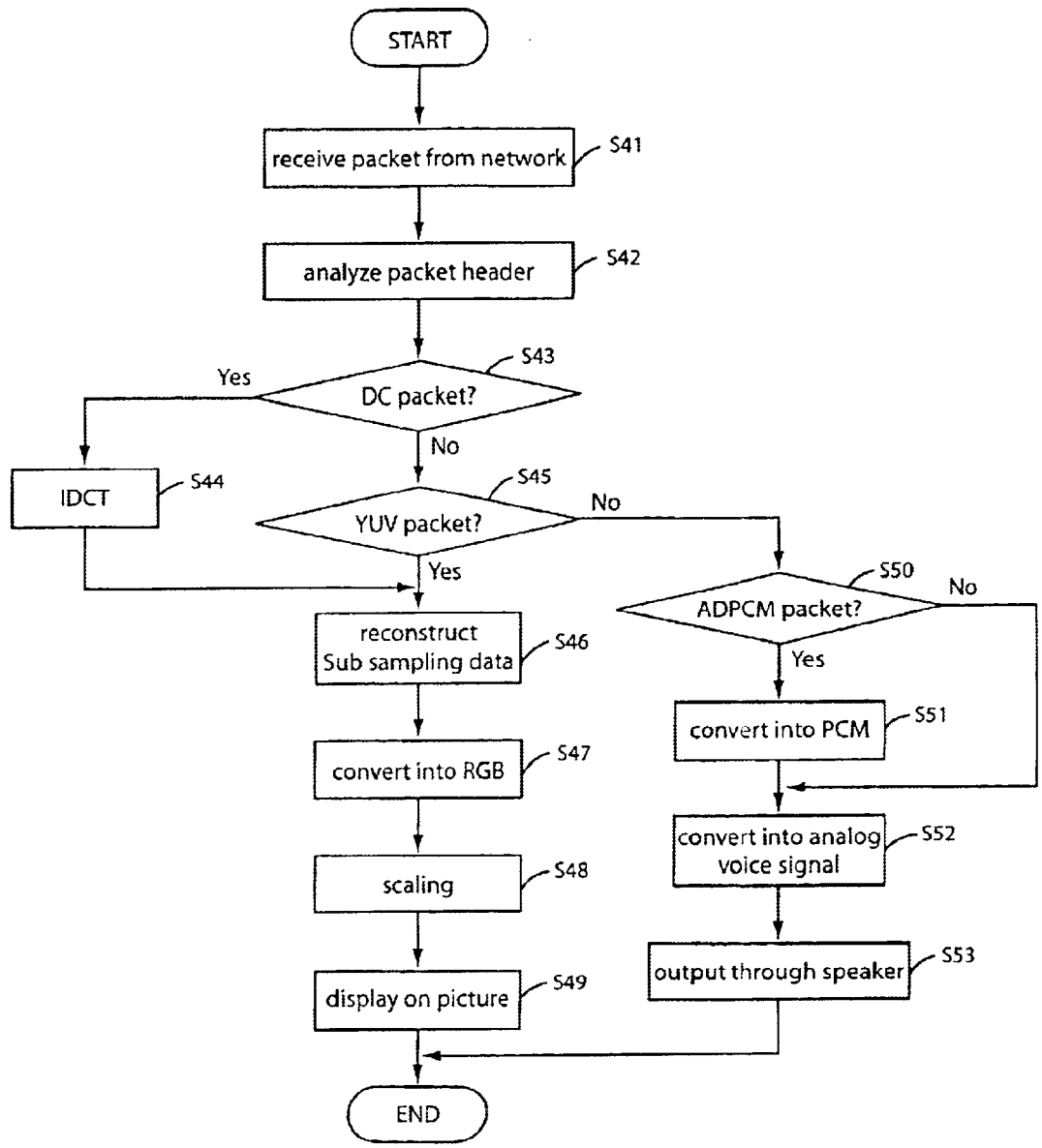
FIG. 6 is a flow diagram showing a packet analysis procedure at a client side during the intermediate data based video/audio streaming according to the present invention.

FIG. 6 is a flow diagram showing an intermediate data receiving procedure at the client side during the intermediate data based video/audio streaming according to the present invention. Referring to FIG. 6, the procedure includes a first step S41 and S42 of analyzing the header of the packet received through the network, a second step S43 and S44 of inverse-discrete-cosine-transforming the video intermediate data when the received packet is the DC packet, a third step S45 and S46 of reconstructing subsampled data when the received packet is the YUV packet or DC data that has undergone inverse discrete cosine transform, a fourth step S47 of converting the reconstructed data into RGB signals, a fifth step S48 of scaling the RGB signals, a sixth step S49 of displaying the scaled video signals on a picture, a seventh step S50 and S51 of, when the received packet is the ADPCM packet, converting the received ADPCM intermediate data into PCM data, an eighth step S52 of converting the PCM data converted or, when the received packet corresponds to the PCM packet, corresponding PCM data into an analog voice signal, and a ninth step S53 of outputting the analog voice signal through a speaker.

There is described below in detail the aforementioned procedure of analyzing and outputting the received packet at the client according to the present invention. First of all, in step S41, the client receives the packet transmitted from the server through the network. The header of the received packet is analyzed in step S42. When the received video packet corresponds to the DC data as intermediate data that has been inverse-quantized, inverse discrete cosine transform (IDCT) is performed to transform the received DC packet into YUV data in step S44. Then, the sub-sampled data is converted into the original video data, and the converted video data is transformed into RGB signals in steps S46 and S47. Subsequently, scaling process is carried out in step S48, and the scaled RGB signals are displayed on the picture in step S49.

Meanwhile, when the received packet corresponds to the YUV packet, the sub-sampled data is reconstructed into the original video data in step S46. Thereafter, the reconstructed video data is converted into RGB signals, to be scaled in steps S47 and S48. The scaled RGB signals are displayed on the picture in step S49. When the received packet corresponds to the ADPCM packet, it is converted into PCM data in step S51 and then converted into the analog voice signal in step S52, being outputted through a speaker in step S53. Here, a special transmission regulation is required to effectively transfer the intermediate data through the network and to reduce the load on the client. This regulation is for the purpose of minimizing damages caused by a loss of the packet which may occur during the network transmission procedure. A protocol for the intermediate data transmission is shown in FIGS. 7A and 7B.

FIG. 7A illustrates the structure of a packet transmitted. In this structure, the packet header with a predetermined size is located at the front part thereof and packet data (DC data, YUV data, PCM data and ADPCM data) in a predetermined size is loaded at the following part. FIG. 7B shows the packet header of FIG. 7A in more detail. As shown in FIG. 7B, the length of the header is 20 bytes, 8 bits are assigned for indicating if the packet data is YUV data (0*A0), voice data (0*A1), DC data (0*A2) or ADPCM data (0*A3), and 3 bytes are assigned to the packet number. In addition, 12 bytes are allotted to a field for controlling data designated by command ID, and 4 bytes are assigned to a field for reservation.

As described above, the present invention transmits video/audio data in the form of intermediate data in case that video/audio files are transferred through a network, to allow the client to be able to simply receive the packet from the network and process it in real time. Accordingly, the client does not need a buffer for storing the compressed files, a decoder for decoding them and a high-speed central processing unit, resulting in simplification of the entire hardware configuration. Furthermore, it is possible to construct the client only with a network card, video card, audio card, controller, and the minimum number of memory because it simply receives and processes the intermediate data. This simplifies the hardware configuration of the client, reducing the client construction cost. Moreover, since the client processes only data entering the network and the server has most of data controlling functions, the server can easily control the client. In addition, if the object that the client requests is a file which can be converted into intermediate data form, the service is available without upgrading the client. That is, even when a new compression format is developed, the client can receive and process data in real time if software for decoding suitable for the server is installed. Accordingly, it is very flexible and economical in system maintenance and its performance improvement.

It will be apparent to those skilled in the art that various modifications and variations can be made in the intermediate data based video/audio streaming of the present invention without departing from the spirit or scope of the invention. Thus, it is intended that the present invention covers the modifications and variations of this invention provided they come within the scope of the appended claims and their equivalents.

What is claimed is:

1. A method of streaming video/audio data through a network between a server and a client, the method comprising:

a video/audio transmitting step of, in case that the server transmits a video/audio file to the client, converting compressed video/audio data to be transmitted into intermediate data and duplicating the intermediate data into a packet to transmit it to the client; and in case that the client processes the intermediate data transmitted through the network, an intermediate data receiving step of a) analyzing the received packet, when the analyzed result corresponds to a video intermediate data packet, reconstructing the original video data from the video intermediate data duplicated into the packet and then outputting it, and b) when the received packet corresponds to an audio intermediate data packet, converting the audio intermediate data duplicated into the packet into analog voice data and outputting it, wherein the video/audio transmitting step comprises:

a first step of, in case that the server transmits the video/audio file to the client, confirming by the server if the compressed file is an audio file, and confirming if the transmission form of the file corresponds to pulse code modulation (PCM) transmission when the file is the audio file;

a second step of converting the audio file to be transmitted into PCM data in case of the PCM transmission;

a third step of converting the audio file to be transmitted into adaptive differential pulse code modulation (ADPCM) data when it is confirmed that its transmission form does not correspond to PCM transmission;

a fourth step of, when the compressed file corresponds to a video file, confirming if its transmission form corresponds to DC transmission;

a fifth step of converting the compressed video file into discrete cosine (DC) data in case of the DC transmission;

a sixth step of converting the compressed video file into YUV data when it is confirmed that its transmission form does not correspond to DC transmission, the YUV data being video signal component data; and a seventh step of transmitting the converted audio/video intermediate data to the network.

2. The method as claimed in claim 1, wherein the seventh step comprises the steps of:

in case that there is intermediate data to be transmitted to the network, confirming the type of the intermediate data, generating an ADPCM packet header when the intermediate data to be transmitted is ADPCM data, and duplicating a predetermined amount of ADPCM data into the packet generated;

generating a PCM packet header when the intermediate data to be transmitted corresponds to PCM data;

duplicating a predetermined amount of PCM data into the packet having the generated PCM header;

generating a DC packet header when the intermediate data to be transmitted is DC data, and duplicating a predetermined amount of DC data into the packet having the generated DC header;

generating a YUV packet header when the intermediate data to be transmitted is YUV data;

duplicating a predetermined amount of YUV data into the packet having the generated YUV header; and transmitting the packet into which the intermediate data is duplicated to the network.

3. The method as claimed in claim 1, wherein the intermediate data corresponds to, in case of video data, DC data obtained by variable-length-demodulating compressed video data and transforming the variable-length-demodulated video data into a frequency range to inverse-quantize it, or to YUV data obtained by inverse-discretecosine-transforming the DC data to convert it into a YUV value, wherein in case of audio data, the intermediate data corresponds to PCM data or ADPCM data.

4. A method of streaming video/audio data through a network between a server and a client, the method comprising:

a video/audio transmitting step of, in case that the server transmits a video/audio file to the client, converting compressed video/audio data to be transmitted into intermediate data and duplicating the intermediate data into a packet to transmit it to the client; and in case that the client processes the intermediate data transmitted through the network, an intermediate data receiving step of a) analyzing the received packet, when the analyzed result corresponds to a video intermediate data packet, reconstructing the original video data from the video intermediate data duplicated into the packet and then outputting it, and b) when the received packet corresponds to an audio intermediate data packet, converting the audio intermediate data duplicated into the packet into analog voice data and outputting it, wherein the procedure performed at the client side comprises:

a first step of analyzing the header of a packet received through the network;

a second step of inverse-discrete-cosine-transforming the video intermediate data when the received packet is a DC packet;

a third step of reconstructing sub-sampled data when the received packet is a YUV packet;

a fourth step of converting the reconstructed data into RGB signals;

a fifth step of scaling the RGB signals;

a sixth step of displaying the scaled video signals on a picture;

a seventh step of, when the received packet is an ADPCM packet, converting the received ADPCM intermediate data into PCM data;

an eighth step of converting the PCM data converted or, when the received packet is a PCM packet, corresponding PCM data into an analog voice signal; and a ninth step of outputting the analog voice signal through a speaker.

5. A method of streaming video/audio data through a network between a server and a client, the method comprising:

a video/audio transmitting step of, in case that the server transmits a video/audio file to the client, converting compressed video/audio data to be transmitted into intermediate data and duplicating the intermediate data into a packet to transmit it to the client; and in case that the client processes the intermediate data transmitted through the network, an intermediate data receiving step of a) analyzing the received packet, when the analyzed result corresponds to a video intermediate data packet, reconstructing the original video data from the video intermediate data duplicated into the packet and then outputting it, and b) when the received packet corresponds to an audio intermediate data packet, converting the audio intermediate data duplicated into the packet into analog voice data and outputting it, wherein the intermediate data corresponds to, in case of video data, DC data obtained by variable-length-demodulating compressed video data and transforming the variable-length-demodulated video data into a frequency range to inverse-quantize it, or to YUV data obtained by inverse-discrete-cosine-transforming the DC data to convert it into a YUV value, wherein the intermediate data corresponds to PCM data or ADPCM data in case of audio data.

* * * * *